Sept. 22, 1970  W. A. WARNOCK  3,529,483
VARIABLE SPEED MECHANISM

Filed July 16, 1968  3 Sheets-Sheet 1

INVENTOR
WILLIAM A. WARNOCK

BY  Bailey + Douty

ATTORNEYS

Sept. 22, 1970   W. A. WARNOCK   3,529,483
VARIABLE SPEED MECHANISM
Filed July 16, 1968   3 Sheets-Sheet 2
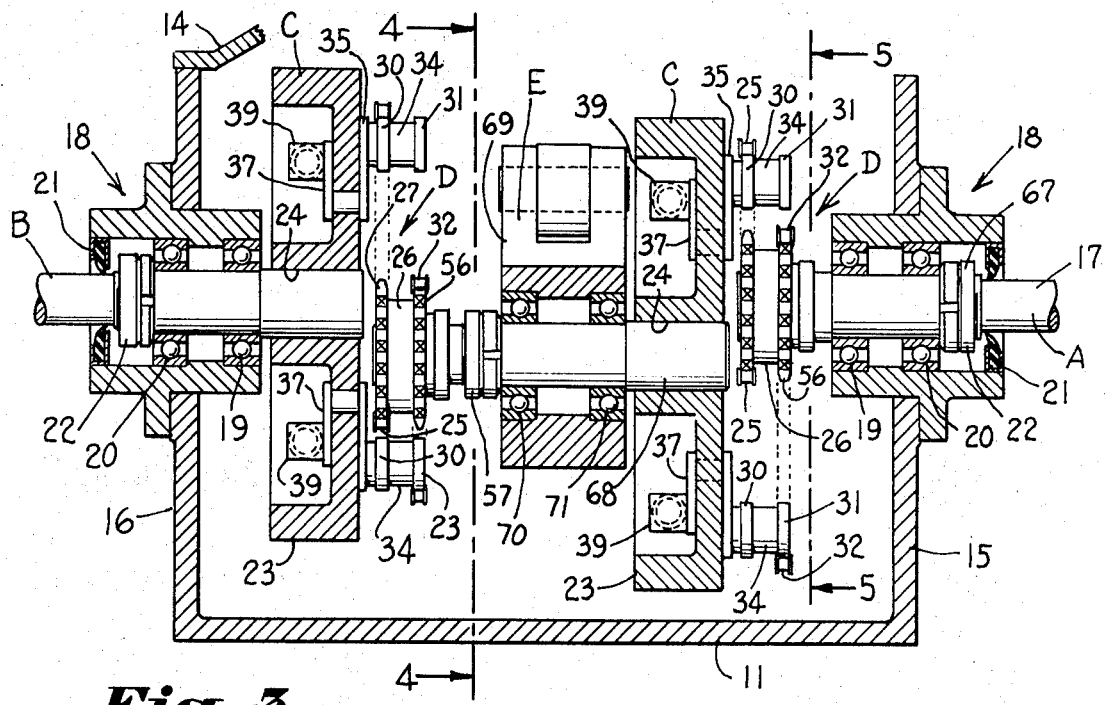
Fig. 3.
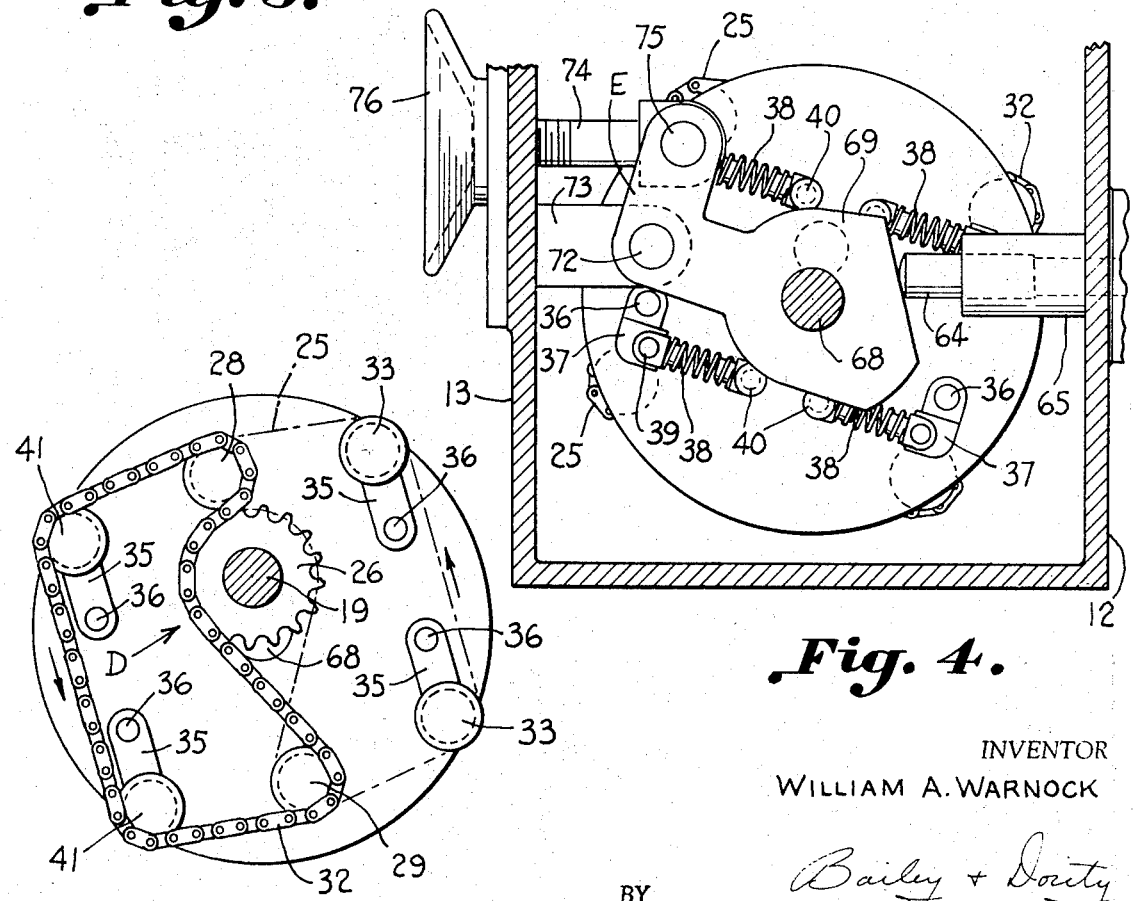
Fig. 4.
Fig. 5.
INVENTOR
WILLIAM A. WARNOCK
BY Bailey + Dority
ATTORNEYS Sept. 22, 1970     W. A. WARNOCK     3,529,483
VARIABLE SPEED MECHANISM Filed July 16, 1968     3 Sheets-Sheet 3

INVENTOR
WILLIAM A. WARNOCK

BY Bailey + Dority

ATTORNEYS 3,529,483
VARIABLE SPEED MECHANISM
William A. Warnock, Box 156–A, Rte. 1,
Lyman, S.C. 29365
Filed July 16, 1968, Ser. No. 745,225
Int. Cl. F16h 9/00, 11/00
U.S. Cl. 74—217                    7 Claims

ABSTRACT OF THE DISCLOSURE

A variable speed mechanism provided with an input shaft and an output shaft, and coupling means interposed therebetween so that when said input and output shafts are shifted eccentrically relative to each other the speed of rotation of the output shaft will vary relative to the driven input shaft.

---

This invention relates to a variable speed mechanism and more particularly, to a variable speed mechanism wherein the output speed for such can be varied by shifting the input shaft eccentrically to the output shaft.

There are many variable speed devices on the market and in some circumstances they operate quite satisfactorily. These include the oil traction, friction and slotted sheave type arrangements. These drives depend on oil traction, mechanical friction, or in the case of the positive type drives the use of a mechanical belt engaged in a slotted sheave. The nature of these drives is such that they are limited in the accuracy that can be obtained in controlling the output speed.

Variable speed drives are in demand particularly in connection with industrial equipment where the loads are relatively constant, and it is important to maintain an accurate speed. The variable speed mechanism constructed in accordance with the present invention not only maintains an accurate output speed but, the output speed can be varied infinitely between a maximum and minimum range. One of the important criterion in determining this range is the physical construction and dimensions of the apparatus. In the subject device the output speed of the variable speed drive can be accurately maintained due to the geometrical arrangements of the part therein. Therefore, rather than depending on the coefficient of friction as is the case in many of the variable speed devices for accuracy, the subject invention depends on the geometrical location or arrangement of the input shaft relative to the output shaft for controlling the output speed of the variable drive. New structure predicated upon a new theory of variable speed devices is set forth herein.

Accordingly, it is an important object of the subject invention to provide a new and novel variable speed drive which has an output speed that can be infinitely varied.

Another important object of the present invention is to provide a variable speed mechanism in which the output speed can be readily varied by changing the position of the input drive shaft relative thereto.

Another important object of the present invention is to provide a variable speed drive mechanism in which its output angular velocity (r.p.m.'s) can be accurately maintained at a constant rate.

Still another important object of the present invention is to provide a variable speed drive which is relatively simple to construct and maintain.

A further object of the present invention is to provide a variable speed drive which can be readily adapted to substantially any particular horse-power requirement.

The construction designed to carry out the invention will be hereinafter described, together with other features thereof.

Figure 1:
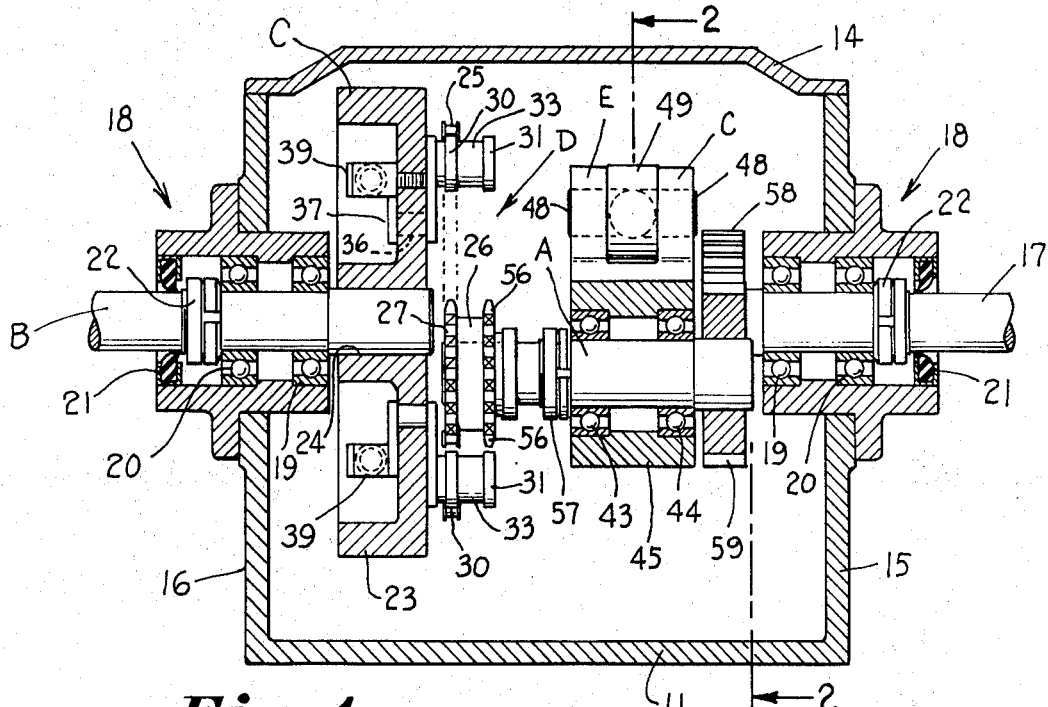
Figure 2:
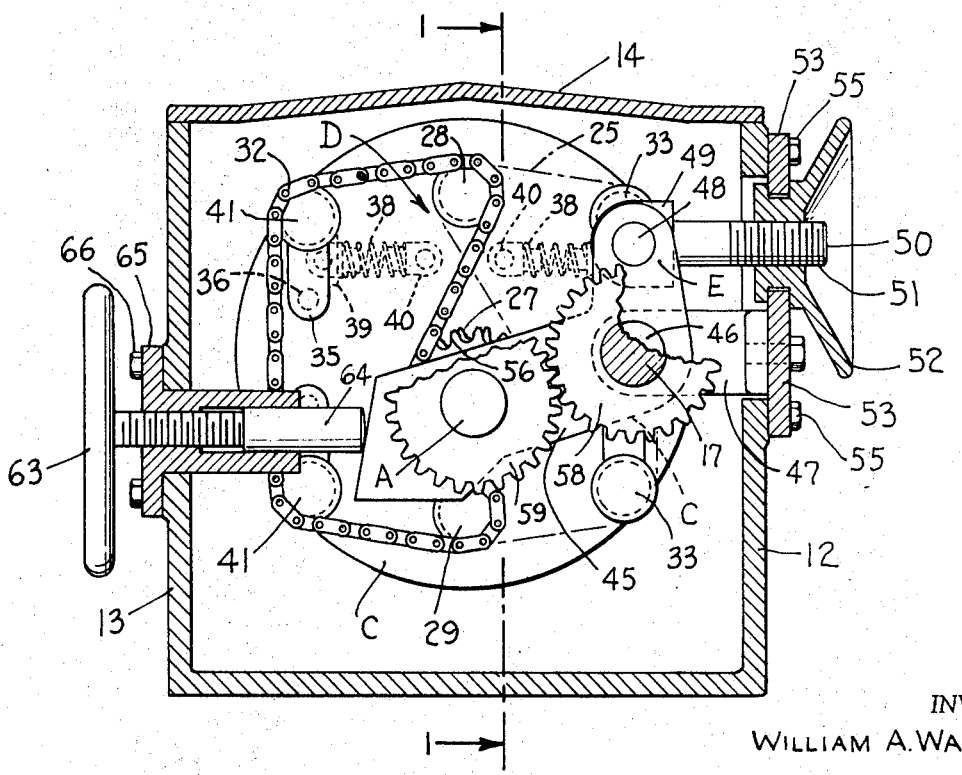
Figure 6:
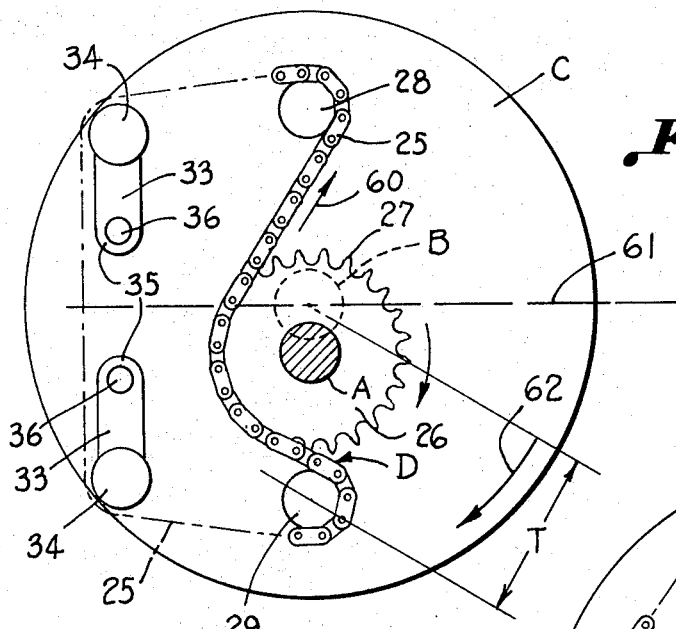
Figure 7:
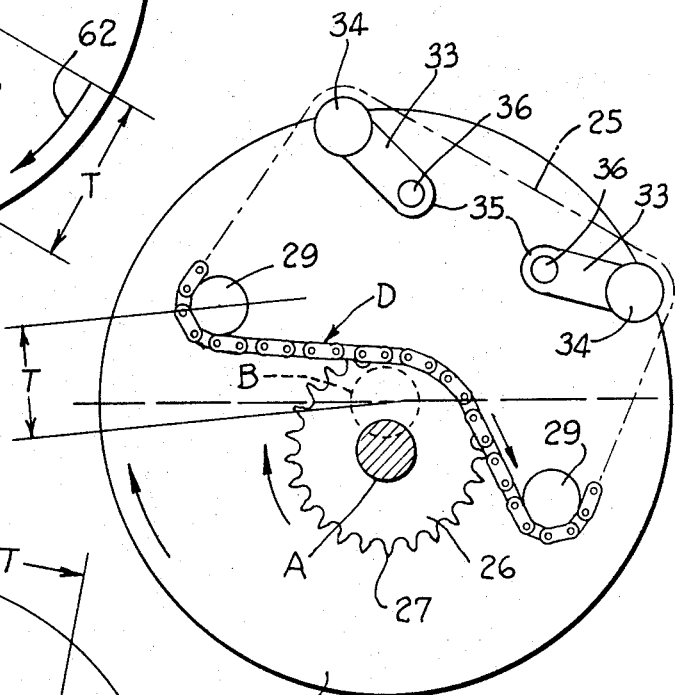
Figure 8:
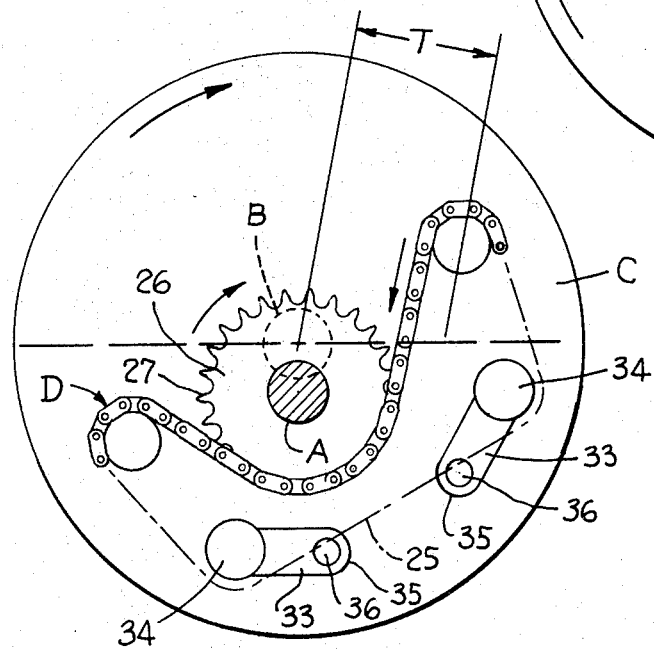

The invention will be more readily understood from a reading of the following specification and by reference to the accompanying drawings forming a part thereof, wherein an example of the invention is shown and wherein:

FIG. 1 is a sectional view taken along the longitudinal axis of said variable speed drive, FIG. 2 is a transverse sectional view taken along the line 2—2 of FIG. 1, FIG. 3 is an elongated sectional view of a modified variable speed drive which incorporates a pair of variable speed devices coupled in series, FIG. 4 is a transverse sectional view taken along line 4—4 illustrating the mechanism for shifting the shafts relative to each other, FIG. 5 is a transverse sectional view taken along the line 5—5 illustrating the coupling mechanism between the input shaft and the output shaft, and FIGS. 6 through 8 are schematic representations illustrating a single endless drive in three operating positions within a given revolution so as to aid in explaining the operation of the variable speed mechanism.

Referring to FIGS. 1 and 2, a variable speed mechanism is illustrated including a drive shaft. Means such as a motor (not shown) is provided for rotating the drive shaft at a uniform speed. An input shaft A is coupled to the drive so as to be rotated at a constant speed therewith. The variable speed drive mechanism has an output shaft B upon which a housing C is carried. Coupling means D is interposed between the input shaft A and the output shaft B for coupling the rotation of the input shaft to the output shaft. Means E is provided for eccentrically shifting the input and output shafts A and B, respectively, relative to each other so as to vary the degree of coupling therebetween in order to vary the speed of rotation of the output shaft B relative to the input shaft A. The housing C has bearing posts carried thereon, and the coupling means includes an endless member or means which interconnects a driving member carried on the input shaft and the bearing posts so that as the input shaft is shifted eccentrically relative to the output shaft the speed of rotation of the output shaft is varied. Spring-biased means are provided for maintaining the endless member taut during the operation of the variable speed mechanism.

The variable speed drive is carried within a housing made of any suitable material, such as cast iron, which has a bottom 11 with side walls 12 and 13, respectively, extending upwardly therefrom to a top 14. End walls 15 and 16, respectively, join the other walls to provide an enclosure for the variable speed drive.

The input shaft A is driven at a constant speed by means of a drive shaft 17 which extends through the end wall 15 of the housing. The drive shaft 17 is, in turn, rotated at a constant speed by any conventional means, such as an induction or synchronous motor. Such can also be driven by any other suitable machinery. The drive shaft 17 is journalled in a bearing arrangement generally referred to at 18, which is suitably mounted in the end wall 15. The bearing arrangement includes a pair of spaced bearings 18 of any suitable type, such as roller bearings, and an oil seal 21. A positioning bushing 22 is carried on the drive shaft 17 between the bearing 20 and the oil seal 21 to restrict the longitudinal movement of the drive shaft 17. While a particular bearing arrangement 18 is disclosed, it is to be understood that any suitable bearing could be used to journal the shaft 17 in the end wall 15. Since an identical bearing arrangement is illustrated as being positioned in the end wall 16 for journalling the output shaft B, a description of such will not be repeated and the same reference characters are utilized.

The output shaft B may be used to drive any suitable load and normally such is used where it is important to maintain a substantially constant r.p.m. Examples of such situations would be for use with paper machines, synthetic fiber machines, etc. The output speed of the variable speed drive is maintained substantially constant and can be varied by merely shifting the input shaft A eccentrically to the output shaft B, such as best illustrated in FIGS. 1, 6, 7 and 8. The speed variation of the output shaft is substantially linear responsive to the displacement of the input shaft relative to the output shaft. This is due to the particular coupling arrangement as provided by the coupling means D.

A housing or flywheel C is carried on the inner end of the output shaft B and is circular in shape with a rim 23 integral with its outer edge. In some particular instances the rim is eliminated and weight is added to the radially extending portion of the housing. The flywheel has a circular opening therein through which the output shaft extends. The output shaft is fixed to the flywheel by an suitable means, such as by keying (not shown). The only connection between the flywheel C and the input shaft A is through the coupling means D which includes a flexible endless linkage means, such as a chain 25. An enlarged driving member or double sprocket 26 is carried on the input shaft and is fixed thereto so that one set of teeth 27 will engage the links of the chain 25. The chain wraps part of the way around the sprocket 26 and then runs to and around rollers 28 and 29 carried on the housing. It is noted that the rollers are circumferentially spaced on the housing, and are spaced radially from the output shaft B. The rollers 28 and 29 are carried on needle bearings so that such can rotate freely on the housing C. Each of the rollers has a double track for accommodating a pair of standard roller chains such as 25 and 32. The chain 25 is looped around the rollers 28 and 29 and the teeth 27 of the sprocket 26 are in meshed relation. The chain also bears against the sprocket 26 from the outside. The chain 25 also passes over a pair of spring-biased rocker arm assemblies 33 which are provided for maintaining the chain taut or under tension, during the operation of the variable speed drive. Each of the rocker arms 33 have a bearing post 34 adjacent to its outer end upon which the chain rides. In some instances the bearing posts 34 are identical to the rollers 28 and 29 except that they are rotatably mounted on the rocker arm rather than directly on the housing. The bearing posts 34 illustrated also have a double track 30 and 31 even though only one track is used. The bearing post is, in turn, journalled in the arm 35 which has its other end attached to a shaft 36 which extends through the body portion of the housing C and has an arm 37 (see FIG. 4) attached thereto, in fixed relation therewith by any suitable means. A compression spring 38 is interposed between a pivotal joint member 39 which is carried on the arm 37 and a fixed post 40 which is carried on the housing in fixed relation therewith. Thus, during the rotation of the housing the rocker arm assembly 33 is allowed to pivot about shaft 36 so as to maintain the chain 25 taut, as illustrated in FIGS. 6 through 8.

The chain 32, which also rides on the rollers 28 and 29, is wrapped around a pair of rocker arm assemblies 41 spaced opposite the rocker arm assembly 33 on the housing C.

Means E is provided for eccentrically shifting the input shaft A relative to the output shaft B so as to vary the degree of coupling between the input shaft A and the output shaft B. Such is explained more fully below in conjunction with the description of FIGS. 6 through 8. The input shaft A is journalled in a bearing member which includes a pair of spaced bearings 43 and 44, which are in turn, carried in the lower end of an L-shaped lever arm 45. The lever arm 45 is, in turn, journalled at its elbow on a shaft 46 which is carried between a pair of spaced brackets 47 which have their other end suitably mounted in fixed relation to the side wall 12. The upper end of the lever arm 45 is bifurcated and has a pin 48 extending between the bifurcated portion and through a pivot joint 49. The pivot joint 49 is, in turn, fixed to an adjustable screw 50 which has threads 51 which threadably engage a rotatable circular handcrank 52. The handcrank 52 is journalled in a plate 53 which is fixed to the side wall 12 as by bolts 55. By rotating the handcrank 52 such will cause the adjustable screw 50 to move in and out relative to the side wall 12 depending on the direction of rotation of the handcrank. The movement of the adjustable screw 50 is, in turn, imparted to the lever arm 45 which causes the lower end in which the input shaft is journalled to move along an arc, the axis of which is the axis of the fixed shaft 46. This movement of the input shaft A causes such to be shifted eccentrically relative to the output shaft B, thus varying the degree of coupling effected through the coupling means D. It is noted that the sprocket 26 is a double sprocket having one set of teeth 27 for engaging the chain 25 while another set of teeth 56 engages chain 32.

A positioning bushing 57 is carried on the input shaft adjacent the lever arm 45 for restricting the longitudinal movement of the input shaft A.

The rotation of the drive shaft 17 is imparted to the input shaft A through the gears 58 and 59, respectively. The gear 58 is carried on the inner end of the drive shaft 17 in meshed relation with gear 59 which is carried on the end of the drive shaft A. It is noted that the drive shaft 17 is in alignment with the shaft 46 upon which the lever arm pivots. Thus, the input shaft can be moved along a given arc by manipulating the handcrank 52 while maintaining gears 58 and 59 in meshed relationship.

Referring now to FIGS. 6 through 8, one explanation as to the new theory of operation of variable speed devices is presented. Only a single chain is shown being wrapped around the double sprocket 26, and normally in actual operation multiple chains are used, such as illustrated in FIG. 2. The operation of the chain 32 is identical with chain 25 except there is a 180° phase displacement. In actual operation a variable speed device using a single chain, such as illustrated in FIGS. 6, 7 and 8 does work, and the main reason for using the double chain is to stabilize or produce a more smoothly running variable speed drive and to increase the power output.

It can be seen that the input shaft A is displaced slightly below the output shaft B. Assuming that the input shaft A is being driven at a constant speed, for example, 1,200 r.p.m.'s, then the housing C and the output shaft B which is fixed thereto would be rotating at a slower speed, for example, 900 r.p.m.'s. Since the chain 25 is wrapped around the rollers 28 and 29 which are attached to the housing C, such also rotates with the housing C at 900 r.p.m.'s. The chain would also be rotating around the rollers 28 and 29 in the direction of the arrow 60 at a linear speed which is equal to the difference in speed of the input shaft A and the output shaft B. When the input shaft A is in alignment with the output shaft B the output shaft rotates at the same speed as the input shaft. As the input shaft A is displaced eccentrically or laterally from the output shaft B the speed of rotation of the output shaft varies substantially linearly with the lateral displacement. In one particular device where the sprocket is four inches in diameter, by displacing the input shaft A relative to the output shaft B two inches, then the output speed would be approximately one-half of the input speed. It is to be understood that the housing C is driven by the chain 25 which wraps around the roller 29 attached to the housing. Such principle is analogous to pulling a rope around a pulley engaged in a block and tackle while lifting a load with the block and tackle. The output speed of the housing C is established when the torque arm is a maximum. It can be seen that the torque arm T is the greatest when such is in the position illustrated in FIG. 6 and becomes shorter as the roller 29 approaches the top of the circle as noted in FIGS. 7 and 8.

For purposes of aiding in understanding the theory of operation of the variable speed drive, assume that the chain is fixed to the bearing post 29 and is not allowed to move relative thereto as the housing rotates. It can be seen that as the sprocket rotates 180° when the bearing post 29 is below the imaginary line 61 the housing C will rotate less than 180° because the periphery of the sprocket 27 rotates at its minimum velocity about the center of the output shaft B. Since the housing travels less than 180° when the bearing post 29 is below the imaginary line responsive to 180° rotation of the input shaft A, then such would have to turn more than 180° above the imaginary line 61 so as to turn a total of 360° responsive to a 360° rotation of the sprocket 27. This would be the case only, if the chain was fixed to the bearing post 29. However, since the chain is not fixed to the bearing post 29 instead of the housing accelerating when the bearing post 29 moves from the lowermost position illustrated in FIG. 6 towards the upper most position of the chain 25 backs off or is allowed to move around the bearing posts 28 and 29 in the direction of the arrow 60. The rocker arm assembly 33 which is spring-biased, allows the chain to be taken up and let out, as illustrated in FIGS. 6 through 8, as the housing is rotated. These rocker arms maintain the chain taut at all times so that a maximum pulling force can be applied through the chain to the bearing post 29.

When the bearing post 29 moves from the uppermost point of its travel clockwise down the right-hand side of the circle to the lowermost point the housing C would tend to decelerate, but due to the movement of the chain around the rollers 28 and 29 such runs at a constant speed.

The chain actually is moving with the housing C around the axis of the output shaft B, as illustrated by the arrow 62, as well as moving around the rollers 28 and 29 as indicated by the arrow 60 at a linear speed corresponding to the difference in speed of rotation of the input shaft A and the output shaft B.

The primary reason that the velocity of the output shaft does not vary within a given revolution is due to: (1) the inertia of the housing C and (2) the applied load on the output shaft B. With the subject device the output shaft B can be made to rotate more slowly than the input shaft if the two members are set eccentric to one another. The reason for this is that the circumference of the driving sprocket 27 rotates more slowly about the center of the output shaft B throughout part of a given revolution. Once the output velocity has been established by the displacement between the input and output shafts the output speed is maintained nearly constant by the inertia of the housing C and the applied load on the output shaft B. If it were not for the inertia of housing C and the applied load, an increase in velocity would tend to take place within a given revolution as the circumference of the driven sprocket 27 came closer to the center of the output shaft B. As previously mentioned, in order to compensate for the increase in velocity that does not take place, chain 25 wraps around the bearing posts 28, 29 in a direction opposite to the clockwise rotation of the sprocket. In other words, if the input shaft A is rotating at 1,200 r.p.m.'s and the output shaft at 900 r.p.m.'s both clockwise, which is the case with this arrangement, then the chain must wrap about the bearing posts 28 and 29 counterclockwise at a linear speed corresponding to the difference in speed of the input and output shafts.

When the housing C is rotating the rocker arms 33 will pivot in order to maintain the chain taut. Since the shaft 36 is fixed to the arm 35, as the bearing post 34 is pulled inwardly such causes the arm 37 on the other side of the housing C to bear against the compression spring 38 compressing such. When the chain is let out then the compression spring 38 causes the rocker arm 34 to move outwardly in order to maintain the chain under tension.

As illustrated in FIG. 2, there are a pair of opposed chains 25 and 32 carried on the housing C, one spaced longitudinally of the other which produces a greater output torque, as well as provides a more balanced housing assembly. The chain 32 also runs around rollers 28 and 29, as well as a pair of rocker arms 41.

Once a desired output speed is obtained by manipulating the handcrank 52 the position of the input shaft A can be locked in place by rotating a handcrank 63 which causes an inner end of a screw member 64 to bear against the lower end of the lever arm 45. The screw member is threadably engaged within a sleeve 65 which is suitably secured to the side wall of the housing by bolts 66.

It is important to maintain the chain under tension since the power capable of being delivered by the output shaft B is directly influenced by such. In one case, it is approximated that 200 to 400 pounds of tension is required to produce a 20 horsepower output.

One suitable chain is referred to as ASA standard roller chain No. 40 and is manufactured by Boston Gear of Boston, Massachusetts. While the coupling device D is shown to include a chain, it is to be understood that other endless drives could be used, such as belts. When a belt is used a pulley would drive such rather than the sprocket 26.

When a greater range of speed variations is desired, a plurality of the variable speed devices, such as illustrated in FIG. 1, can be connected in series, such as illustrated in FIG. 3. The same reference characters that are used in describing the device in FIGS. 1 and 2 will be used on corresponding or identical parts of the device illustrated in FIGS. 3 through 5.

Referring in detail to FIG. 4, it can be seen that two stages are connected in series. The input shaft A of the first stage is carried in a bearing assembly 18 positioned in the end wall 15. The bushing 67 is carried on the input shaft so as to restrict the longitudinal movement thereof. The output shaft 68 of the stage on the right-hand side is also the input shaft for the stage shown on the left-hand side in FIG. 3. As can be seen, the housing C on the right is mounted on one end of the shaft 68, while the sprocket 26 for the stage on the left is mounted on the other end of the shaft 68. Thus, in order to eccentrically displace the input shaft relative to the output shaft of the two stages it is necessary to move the combined input and output shaft 68 which causes housing C on the right to move relative to the input shaft A. This also moves the input shaft for the stage on the left relative to the output shaft B. The manner in which the common input and output shaft 68 is shifted is illustrated in FIG. 4, and includes an L-shaped lever arm in which the shaft 68 is journalled on the bearings 70 and 71. A shaft 72 extends through the elbow of the lever arm and is supported between a pair of spaced brackets 73 which are, in turn, fixed to the side wall 13 of the housing in any suitable manner, such as by bolting or welding. An adjustable screw 74 is pivotally secured to the upper end of the lever arm by a pin 75. A handcrank 76 threadably engages the screw 74 so that when such is rotated it causes the lever arm 69 to pivot about the shaft 72, thus shifting the combined input and output shaft 68. A screw member 64 is provided for locking the lever arm 69 in a desired position. The screw member operates in the same way as that described in connection with the device illustrated in FIG. 2, and bears against an inclined surface on the lever arm 69.

By displacing the shaft 68 laterally relative to the input shaft A on the right, and the output shaft B on the left the r.p.m.'s can be stepped down in stages. For example, if the input speed on shaft A is 1,200 r.p.m.'s the rotation of shaft 68 could be 900 r.p.m.'s, caused by the step-down effect of the stage on the right and consequently the input speed of the stage on the left would also be 900 r.p.m.'s. The output rotation of shaft B would be 600 r.p.m.'s as a result of the left stage stepping down from 900–600 r.p.m.'s. These specific values are given to aid in understanding the operation of the device and the actual speed reduction would depend on the physical size of the unit, as well as the lateral displacement of shaft 68. The maximum step-down ratio would be approximately 2:1 per stage.

In one particular device the flywheel C is 16 inches in diameter and weighs approximately 125 pounds, the sprocket 26 is 4 inches in diameter, and the chain is an ASA No. 40 chain. One suitable spring 38 which may be used is manufactured by E. A. Baumbach Mfg. Co., of Chicago, Ill., and is referred to as L–273 having a length of 4 inches.

While a preferred embodiment of the invention has been described using specific terms, such description is for illustrative purposes only, and it is to be understood that changes and variations may be made without departing from the spirit or scope of the following claims.

What is claimed is:

1. A variable speed mechanism comprising: an input shaft; means for rotating said input shaft; an output shaft; a housing carried on said output shaft; a flexible means interposed between said input shaft and said housing for coupling the rotation of said input shaft to said housing and output shaft; and means for laterally shifting said input and output shafts relative to each other so as to vary the degree of coupling therebetween in order to vary the revolutions per minute of said output shaft relative to said input shaft.

2. A variable speed mechanism as set forth in claim 1 wherein an enlarged driving member is carried on said input shaft; bearing posts carried on said housing; said flexible means interconnecting said driving member and said bearing post so that as said input shaft is shifted laterally relative to said output shaft the speed of rotation of said output shaft is varied relative to the speed of rotation of said input shaft.

3. A variable speed mechanism comprising: a driven input shaft; an output shaft; a housing carried on one of said shafts; a driving member carried on the other shaft; a flexible endless means coupled between said housing and said driving member for coupling the rotation of said input shaft to said output shaft; and means for shifting said input shaft and said output shaft laterally relative to each other so as to vary the revolutions per minute of said output shaft relative to said input shaft whereby the inertia of said housing aids in maintaining the angular velocity of said output shaft substantially constant within a given revolution.

4. The variable speed mechanism as set forth in claim 3 wherein a spring-biased means maintains said endless means taut during operation of said variable speed mechanism.

5. The variable speed mechanism as set forth in claim 3, wherein said endless means is a chain and said driving member is a sprocket; a pair of bearing posts carried in circumferentially spaced relation to each other on said housing and spaced radially from said output shaft; and said chain being in driving relationship with said sprocket and allowed to run freely over said bearing post.

6. The apparatus as set forth in claim 3, wherein a plurality of said variable speed mechanisms are connected in series and wherein the output shaft of one variable speed mechanism is the input shaft of the next variable speed mechanism.

7. A variable speed mechanism comprising an input shaft; means for rotating said input shaft; an output shaft; a housing carried on said output shaft; linkage means coupling said input shaft to said housing causing said output shaft to rotate responsive to rotating said input shaft; means for mounting said linkage means between said input shaft and housing for moving said linkage at a linear speed corresponding to the difference in speed of rotation of said input and output shafts while rotating with said housing, and means for shifting said input shaft laterally relative to said output shaft so as to vary the speed of rotation of said output shaft relative to said input shaft.

References Cited

UNITED STATES PATENTS

| | | | |
|---|---|---|---|
| 2,352,797 | 7/1944 | Miller | 74—217 |
| 2,464,635 | 3/1949 | Cunningham | 74—217 |
| 2,876,616 | 3/1959 | Austin, et al. | |

JAMES A. WONG, Primary Examiner